United States Patent
Dai

(10) Patent No.: US 8,665,135 B2
(45) Date of Patent: Mar. 4, 2014

(54) RADAR DEVICE

(75) Inventor: Koji Dai, Nishinomiya (JP)

(73) Assignee: Furuno Electric Company Limited, Nishinomiya (JP)

( * ) Notice: Subject to any disclaimer, the term of this patent is extended or adjusted under 35 U.S.C. 154(b) by 273 days.

(21) Appl. No.: 12/778,834

(22) Filed: May 12, 2010

(65) Prior Publication Data

US 2010/0289690 A1  Nov. 18, 2010

(30) Foreign Application Priority Data

May 13, 2009 (JP) .................................. 2009-116992

(51) Int. Cl.
*G01S 13/534* (2006.01)
*G01S 13/93* (2006.01)

(52) U.S. Cl.
USPC .............................................. 342/41; 342/160

(58) Field of Classification Search
USPC .......................................................... 342/41
See application file for complete search history.

(56) References Cited

U.S. PATENT DOCUMENTS

| | | | |
|---|---|---|---|
| 3,725,918 A * | 4/1973 | Fleischer et al. ................. | 342/41 |
| 4,313,115 A * | 1/1982 | O'Sullivan ...................... | 342/41 |
| 4,553,144 A | 11/1985 | Houdard et al. | |
| 4,623,966 A * | 11/1986 | O'Sullivan .................... | 701/301 |
| 4,706,090 A * | 11/1987 | Hashiguchi et al. ............. | 342/41 |
| 6,512,477 B2 | 1/2003 | Suzuki | |
| 6,683,541 B2 * | 1/2004 | Staggs et al. .................. | 340/961 |
| 6,703,945 B2 * | 3/2004 | Kuntman et al. ............. | 340/961 |
| 7,768,443 B2 * | 8/2010 | Imazu et al. .................... | 342/41 |
| 2006/0082493 A1* | 4/2006 | Fujikawa et al. ............. | 342/159 |

FOREIGN PATENT DOCUMENTS

| | | |
|---|---|---|
| CN | 1239551 A | 12/1999 |
| EP | 0080397 A1 | 6/1983 |
| EP | 0396071 A3 | 11/1990 |
| EP | 0405430 A3 | 1/1991 |
| JP | 7-304495 A | 11/1995 |
| JP | 8-86857 A | 4/1996 |
| JP | 11-183616 A | 7/1999 |
| JP | 2001-42026 A | 2/2001 |

(Continued)

OTHER PUBLICATIONS

"Technology Highlight: Radar." Northrop Grumman web page. Apr. 24, 2008. Accessed May 17, 2012. <http://web.archive.org/web/20080424011846/http://www.es.northropgrumman.com/technologies/radar/index.html>.*

(Continued)

*Primary Examiner* — Matthew M Barker
(74) *Attorney, Agent, or Firm* — Birch, Stewart, Kolasch & Birch, LLP

(57) ABSTRACT

A radar device is disclosed, which includes an antenna for transmitting an electromagnetic wave and receiving an echo signal from a target object while rotating in a horizontal plane, a display module for displaying the target object so as to correspond the echo signal to a position of the target object with respect to the antenna, a speed calculation module for calculating a relative velocity of the antenna and the target object, and a risk level detection module for detecting a risk level of the target object based on the relative velocity of the target object calculated by the speed calculation module. The speed calculation module calculates the relative velocity of the target object based on a change in phases of at least two of the echo signals received at a different time. The display module controls a display mode of the target object based on the risk level.

14 Claims, 5 Drawing Sheets

(56) References Cited

FOREIGN PATENT DOCUMENTS

| | | |
|---|---|---|
| JP | 2001-183449 A | 7/2001 |
| JP | 2002-116249 A | 4/2002 |
| JP | 2003-48595 A | 2/2003 |
| JP | 2006-226685 A | 8/2006 |
| WO | WO 89/04003 A1 | 5/1989 |
| WO | WO 98/47022 A1 | 10/1998 |

OTHER PUBLICATIONS

Bizup et al., "Maneuver Detection Using the Radar Range Rate Measurement", pp. 1-21, Nov. 25, 2002.

Japanese Office Action for corresponding Application No. 2009-116992 dated Mar. 5, 2013.

Chinese Office Action, dated Jun. 18, 2013, for Chinese Application No. 201010184139.8.

* cited by examiner

RADAR DEVICE

CROSS-REFERENCE TO RELATED APPLICATION(S)

This application claims priority under 35 U.S.C. §119 to Japanese Patent Application No. 2009-116992, which was filed on May 13, 2009, the entire disclosure of which is hereby incorporated by reference.

TECHNICAL FIELD

The present invention relates to a radar device, and more particularly to a radar device having a configuration for determining a target object with a high risk level of collision with a ship and displaying such a target object intelligibly.

BACKGROUND

In common radar devices, when displaying a radar image, a target object is displayed in a color according to an intensity of a received echo. In such a radar device, an operator typically looks at the radar image for several scans and determines by his/her experiences whether a target object currently displayed on a screen will be an obstacle for a ship concerned (that is, whether there is any risk of a collision).

However, if the operator is inexperienced for reading such a radar image, it is difficult to determine whether the target object currently displayed will be an obstacle. Even if the operator is well experienced for reading such a radar image, he/she cannot determine a collision risk level unless he/she watches the screen at least for several scans.

For this point of view, JP2003-48595(A) discloses an other ship display device which is configured so that other ships with high degrees of collision risk are displayed by high visibility and other ships with low degrees of collision risk are displayed by low visibility. Thus, because the disclosure displays target objects with high degrees of collision risk by high visibility, the display method is particularly suitable for the purpose of collision avoidance.

Further, JP2003-48595(A) uses AIS (Automatic Identification System) or ARPA (Automatic Radar Plotting Aids) as an instrument for detecting information on other ships.

ARPA uses a technique for detecting moving vectors (moving speed and direction) of a target object from a transition of past radar images. However, because ARPA typically suffers a large signal processing load, the number of the target objects which can be acquired and tracked is limited. In order to detect the moving information on the target object based on the radar images for past several scans, there arises a problem of taking time for detecting that the target object changed the moving speed and the direction. Further, if irregular echoes, such as sea surface reflections, appeared near the target object, there also arises a problem that the captured image of the target object is blended with the sea surface reflection image or the like and, thus the target object will be lost.

On the other hand, AIS is a technique of periodically transmitting positional information, traveling information and the like on a ship concerned by wireless communication and receiving such information from other ships to extract required information therefrom. However, if other ships do not carry AIS, the information on the other ships cannot be detected. Further, because a repetition of communication is limited, the information on the other ships cannot be acquired quickly.

As described above, it is difficult for the configuration of JP2003-48595(A) to certainly grasp the target objects with high degrees of collision risk to display them in real time.

SUMMARY

The present invention is made in view of the above situations, and provides a radar device that can certainly grasp a target object with a high collision risk level in real time.

According to an aspect of the invention, a radar device includes an antenna for transmitting an electromagnetic wave and receiving an echo signal from a target object while rotating in a horizontal plane, a display module for displaying the target object so as to correspond the echo signal to a position of the target object with respect to the antenna, a speed calculation module for calculating a relative velocity of the antenna and the target object, and a risk level detection module for detecting a risk level of the target object based on the relative velocity of the target object calculated by the speed calculation module. The speed calculation module calculates the relative velocity of the target object based on a change in phases of at least two of the echo signals received at a different time. The display module controls a display mode of the target object based on the risk level.

The display module may use the display mode in which the display of a target object having a higher risk level is emphasized compared with a target object having a lower risk level.

The radar device may further include a kind determination module for detecting a signal kind of the echo signal. The risk level detection module may detect the risk level of the target object based on the signal kind detected by the kind determination module and the relative velocity calculated by the speed calculation module.

The display module may display the target object using data that corresponds to the echo signal and contains two or more pixels, and the kind determination module may detect the signal kind for every data corresponding to the two or more pixels.

The signal kind may include at least a stationary target object, a moving target object, and a sea surface reflection.

The risk level detection module may detect the moving target object by a higher risk level compared with the stationary target object and the sea surface reflection among the signal kinds.

The display module may set a color or a color palette to display the target object based on the risk level.

The display module may control a darkness of the color to display the target object based on an intensity of the echo signal from the target object.

The risk level detection module may detect the target object that is located nearer from the antenna by a higher risk level.

The speed calculation module may calculate the relative velocity based on the echo signal currently received by the antenna, the echo signal previously received by the antenna, and the phase change therebetween.

The risk level detection module may detect the risk level of the target object based on the relative velocity of the target object, and information acquired from at least one of ARPA and AIS.

According to another aspect of the invention, a method of displaying a screen image of a radar device includes transmitting an electromagnetic wave and receiving an echo signal from a target object, calculating a relative velocity component of the radar device and the target object in a radiating direction of the electromagnetic wave from the radar device based on a change in phases of at least two of the echo signals received at a different time, obtaining a risk level of the target object based on the calculated relative velocity of the target object, and controlling a display mode of the target object based on the obtained risk level.

BRIEF DESCRIPTION OF THE DRAWINGS

The present disclosure is illustrated by way of example and not by way of limitation in the figures of the accompanying drawings in which the like reference numerals indicate like elements and in which.

DETAILED DESCRIPTION

Figure 1:
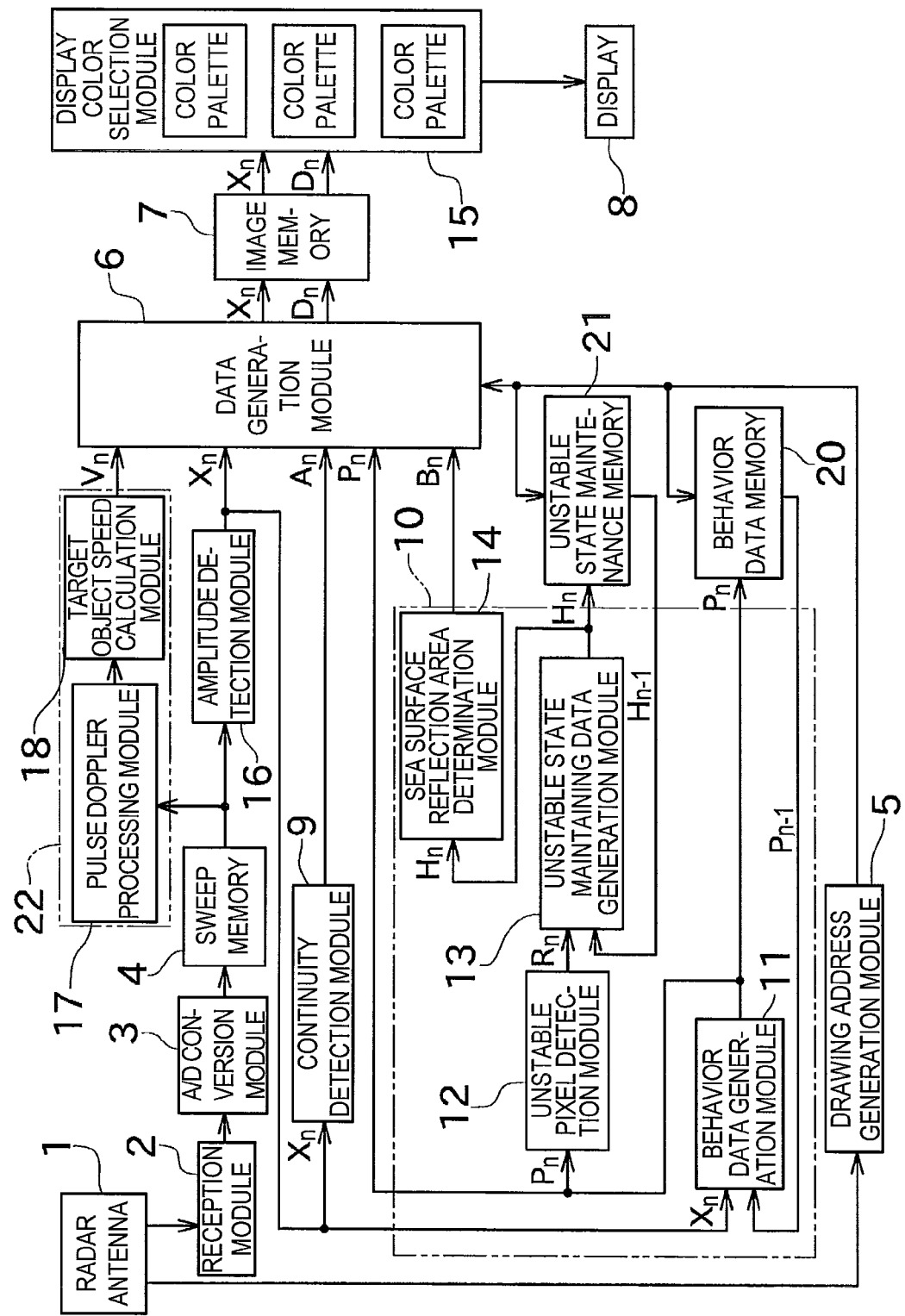
FIG. 1 is a block diagram showing a substantial configuration of a radar device according to an embodiment of the invention.

Next, an embodiment of the present invention is described with reference to the appended drawings. FIG. 1 is a block diagram showing a substantial configuration of a radar device for ships according to this embodiment. Although this embodiment explains particularly the radar device for ships, the application of the radar device of the invention is not limited to ships, and the radar device may be applied to any other ships or vehicles or moving bodies.

As shown in FIG. 1, the radar device of this embodiment is provided with a radar antenna 1 which can emit a signal with sharp directivity (pulse-shaped electric wave), and receive an echo (reflection signal) from a target object around the radar device. The radar antenna 1 repeatedly transmits and receives the signal while rotating in a horizontal plane at a predetermined rotation cycle.

A display 8 is a CRT, an LCD or the like, and is configured as a raster scan type display in which a graphical display is possible.

Typically, a period of time from emission of a radiated signal to return of an echo is proportional to a distance from the radar antenna 1 to the target object. Therefore, by setting the period of time from emission of the radiated signal to reception of the echo signal to a moving radius r and an antenna angle when transmitting and receiving the electric wave concerned to a deviated angle θ, a position of the target object can be acquired in a polar coordinate system centering on the radar antenna 1. Further, by plotting the position of the target object on a plane, which is acquired in the polar coordinate system, a radar image can be obtained. The radar device of this embodiment can check the situation of the target objects around the device by displaying the radar image on the display 8.

The radar antenna 1 receives unused echoes such as sea surface reflections, as well as the reflection signals from the target objects. In addition, the radar antenna 1 may also receive radar signals from other ships (interference signals). The signals which the radar antenna 1 received include white noises. Therefore, the sea surface reflections, the interference signals, the white noises and the like may be plotted and displayed on the display 8 in addition to the target objects. Thus, in the following description, the echoes from the target objects, the sea surface reflections, the interference echoes, the white noises and the like may be generically referred to as "received signal" taking the above situations in consideration.

When displaying the radar image on the display 8, the radar device of this embodiment estimates risk levels of the target objects and the like, and displays the target objects in different colors according to the risk levels. Thereby, an operator of the radar device can grasp the risky target objects intuitively. Note that a configuration for classifying by color by estimating the risk level of the target object will be described later.

Next, a configuration for receiving the echoes and acquiring data of the echoes is described. When the radar antenna 1 receives an echo, a received signal is outputted to a reception module 2, the signal is converted into digital data by an A/D conversion module 3, and after that, the converted signal is stored in a sweep memory 4 temporarily. Configurations of the respective modules are described below.

The reception module 2 detects and amplifies the received signal from the radar antenna 1. In this embodiment, in order to acquire information on an amplitude and a phase of the received signal, the reception module 2 performs the quadrature detection (IQ phase detection). By performing the quadrature detection in the reception module 2, a complex signal consisting of an I-signal and a Q-signal is obtained. Hereinafter, the quadrature detection is briefly described with reference to FIG. 2.

Here, it is assumed that a carrier wave of the radiated signal (pulse-shaped electric wave) which the radar antenna 1 emits is a cosine wave at a frequency $f_0$. In this case, if a period of time from emission of the radiated signal is "t," and an amplitude of the received signal (echo) inputted into the reception module 2 is X(t), a waveform S(t) of the echo can be expressed by the following Equation (1). Here, φ(t) is a phase of a carrier wave of the received echo with respect to the carrier wave of the radiated signal (hereinafter, simply referred to as "phase").

$$S(t)=X(t)\cdot\cos[2\pi f_0 t+\phi(t)] \quad (1)$$

Figure 2:
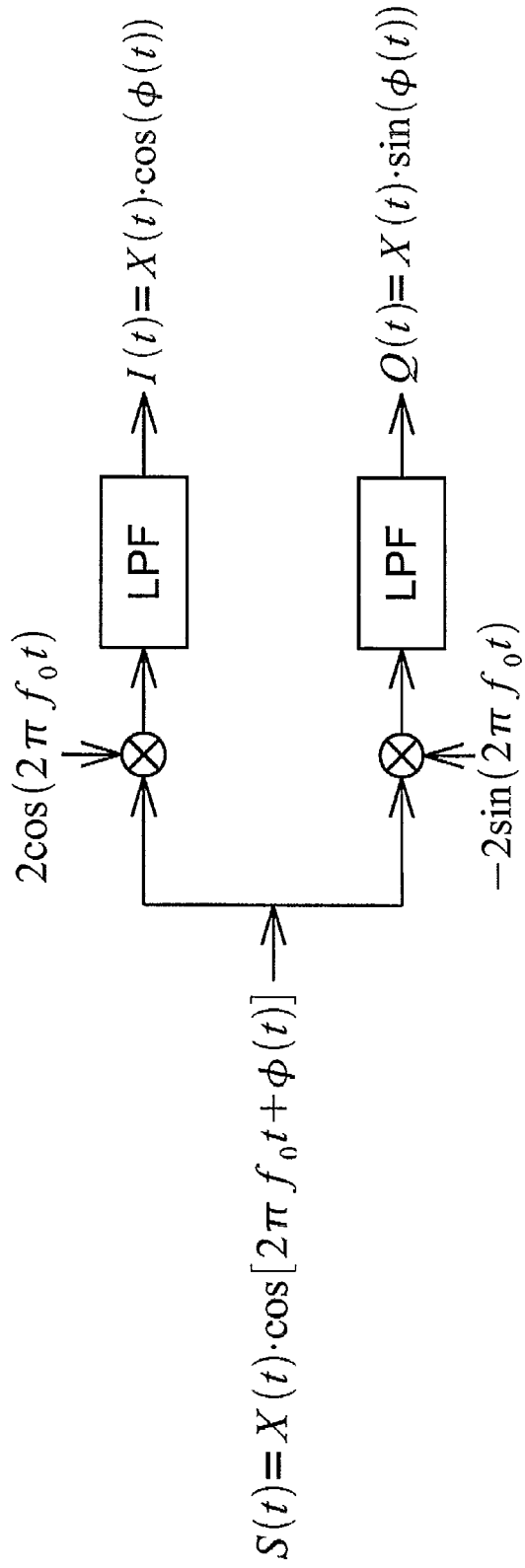
FIG. 2 is a diagram illustrating a method of quadrature detection.

As shown in FIG. 2, the received signal S(t) is branched into two systems after being received by the reception module 2. Then, a reference signal $2\cos(2\pi f_0 t)$ of the same phase and the same frequency as the carrier wave of the radiated signal is integrated and synthesized to one of the received signal S(t), a signal expressed by the following Equation (2) can be obtained. In addition, a reference signal $-2\sin(2\pi f_0 t)$ which is shifted in phase by 90 degrees at the same frequency as the carrier wave of the radiated signal is integrated and synthesized with the other received signal S(t), and a signal expressed by the following Equation (3) can be obtained.

$$S(t)\cdot 2\cos(2\pi f_0 t)=X(t)\cdot\cos[4\pi f_0 t+\phi(t)]+X(t)\cdot\cos(\phi(t)) \quad (2)$$

$$S(t)\cdot -2\sin(2\pi f_0 t)=X(t)\cdot\sin[4\pi f_0 t+\phi(t)]+X(t)\cdot\sin(\phi(t)) \quad (3)$$

The first terms on the right-hand side of Equations (2) and (3) (doubled frequency components) are removed by a low pass filter (LPF). Thereby, the I-signal shown in the following Equation (4) and the Q-signal shown in the following Equation (5) are outputted from the reception module 2.

$$I(t)=X(t)\cdot\cos(\phi(t)) \quad (4)$$

$$Q(t)=X(t)\cdot\sin(\phi(t)) \quad (5)$$

The I-signal and the Q-signal which are analog signals are inputted into the A/D conversion module 3. The A/D conversion module 3 samples the I-signal and the Q-signal and converts them into digital data of two or more bits (IQ received data) to output them to the sweep memory 4. Note that other than the method of generating the I-signal and the Q-signal analogically as described above, a method of generating the I-signal and the Q-signal digitally after directly sampling the received signal may also be used.

The sweep memory 4 is a buffer which can store in real time the IQ received data for one sweep. Note that a "sweep" means a series of operation from transmission of a signal to transmission of the subsequent signal, and "received data for one sweep" means data received during a period from transmission of a signal to transmission of the subsequent signal.

The data for one sweep is stored from a head address of the sweep memory 4 in order. Here, the I-signal data of the IQ received data stored at n-th address from the head address of the sweep memory 4 is "$I_n$," and the Q-signal data at the n-th address is "$Q_n$." In addition, if it is assumed that an intensity (amplitude) of the echo when sampling the n-th data is $X_n$, and a phase at this time is $\phi_n$, $I_n$ and $Q_n$ can be expressed by the following equations.

$$I_n = X_n \cdot \cos \phi_n \quad (6)$$

$$Q_n = X_n \cdot \sin \phi_n \quad (7)$$

Next, a configuration for generating image data of the radar image to be displayed on the display 8 is described. The display 8 is configured as a raster scan type display, and the image data to be displayed by the display 8 is stored in an image memory 7. The image data stored in the image memory 7 is raster data which consists of two or more pixels, is read out at a high speed synchronizing with raster scanning of the display 8 to be transferred to a display color selection module 15 (described later).

In the image data, each pixel is stored so as to be arranged in an X-Y orthogonal coordinate system where a bow direction is set to Y-axis, a beam direction to X-axis, for example. The data of each pixel consists of two or more bits, and in each pixel, data indicating an echo intensity $X_n$ and an echo risk level $D_n$ is stored. When reading out the image data synchronizing with the raster scanning of the display 8, for example, by displaying pixels with strong echo intensities $X_n$ in a dark color and displaying pixels with weak echo intensities $X_n$ in a light color, a situation of the echoes around the device in a horizontal plane (radar image) can be displayed on the display 8. Note that the echo risk level $D_n$ will be described later.

Next, a configuration for calculating the echo intensity $X_n$ of each pixel is described. When the IQ received data is newly written in the sweep memory 4, the memory 4 which is a buffer sequentially outputs the IQ received data to an amplitude detection module 16 and a pulse doppler processing module 17 (described later) before the IQ received data is overwritten by the subsequent sweep.

When the IQ received data is inputted, the amplitude detection module 16 detects the echo intensity of the IQ received data by carrying out a vector synthesis of the I-signal and the Q-signal. Here, the echo intensity $X_n$ of the IQ received data stored at the n-th address from the head address of the sweep memory 4 by Equations (6) and (7) can be derived by the following Equation (8).

$$X_n = \sqrt{I_n^2 + Q_n^2} \quad (8)$$

The echo intensity $X_n$ derived by the amplitude detection module 16 is outputted to the image memory 7 via a data generation module 6 described later, and is stored at the corresponding address. Which address of the image memory 7 the echo intensity $X_n$ is stored at (that is, which pixel of the current image data is processed) is determined by a drawing address generation module 5. The echo intensity $X_n$ is also outputted to a behavior data generation module 11 and a continuity detection module 9.

Into the drawing address generation module 5, sweep angle data (data indicating an angle θ of the radar antenna 1) with respect to a predetermined direction (for example, the bow direction) is inputted from the radar antenna 1. The drawing address generation module 5 generates an address which specifies a pixel corresponding to the IQ received data based on the angle θ of the radar antenna 1 and a read-out position "n" of the IQ received data from the sweep memory 4. Specifically, the drawing address generation module 5 is constituted by hardware which realizes calculations of the following Equations (9) and (10). Here, X and Y are addresses which specify a pixel of the image data stored in the image memory 7. Further, Xs and Ys are addresses which specify a pixel corresponding to a center position of the sweep (position of the radar antenna 1) in the image data stored in the image memory.

$$X = X_s + n \cdot \sin \theta \quad (9)$$

$$Y = Y_s + n \cdot \cos \theta \quad (10)$$

When the echo intensity $X_n$ is outputted to the image memory 7 from the data generation module 6, the addresses X and Y are inputted into a specified address part of the image memory 7. By doing this, a position of the target object echo acquired in a polar coordinate system is converted into an X-Y orthogonal coordinate system to store data of the echo intensity $X_n$ in a pixel at a position of coordinates X and Y corresponding to a position of the target object echo. As a result, image data where the echo intensity is plotted on a plane corresponding to the position of the target object echo is generated and, thus, a radar image can be displayed on the display 8 based on this. The address of the pixel which the drawing address generation module 5 outputs is also inputted into a behavior data memory 20 and an unstable state maintenance memory 21 described later.

Next, a configuration for discriminating the echo of the target object from the other echoes is described. First, a configuration for discriminating echoes of sea surface reflections by observing a temporal continuity of the echoes is described.

As being well known, in ship radars, echoes from the sea surface around a ship concerned are received. The sea surface reflections are preferably discriminated from the echoes from the target object. Here, the echoes of sea surface reflections are detected irregularly where they do not appear at the same positions for every scan. As considering this aspect conversely, if echoes are detected irregularly in a certain pixel without any temporal continuity, it can be determined that the echoes are sea surface reflections.

Thus, the radar device of this embodiment is provided with a sea surface reflection area detection module 10 for detecting a sea surface reflection area based on pixels in which detection echoes are unstable. The sea surface reflection area detection module 10 includes the behavior data generation module 11, an unstable pixel detection module 12, an unstable state maintaining data generation module 13, and a sea surface reflection area determination module 14.

First, the behavior data generation module 11 is described. When the echo intensity $X_n$ is calculated by the amplitude detection module 16 and the address of a pixel which stores the echo intensity $X_n$ is determined by the drawing address generation module 5, the behavior data generation module 11 derives behavior data $P_n$ indicating the existence of the echoes for several scans of the past in the pixel concerned, and outputs it to the behavior data memory 20.

The behavior data memory 20 is a storage medium which sets orthogonal coordinate system addresses so as to correspond to the addresses of the image memory 7, and stores the behavior data $P_n$ corresponding one to one to each pixel of the image memory 7.

The behavior data $P_n$ consists of two or more bits, and is data obtained by storing echo detection flags indicating the existence of echoes over several scans of the past. For example, if the behavior data memory 20 is constituted with 8 bits per pixel, the echo detection flags for past eight scans can be expressed by the behavior data $P_n$. Specifically, if the behavior data $P_n$ of a certain pixel is "00000011," for example, it indicates that echoes are detected at a position of the pixel for the last two scans, but echoes are not detected for six scans before that. Note that "scan" means carrying out a sweep around the device over 360 degrees by transmitting and receiving electric waves while the antenna rotates one revolution.

In order to generate the behavior data $P_n$, the behavior data generation module 11 performs the following processing. First, the behavior data generation module 11 determines whether the echo intensity $X_n$ inputted from the amplitude detection module 16 is more than a detection threshold set in advance. For the detection threshold, a value obtained by adding a predetermined offset to a white noise level detected is used, for example. The behavior data generation module 11 generates an echo detection flag which consist of "1" if the current echo intensity $X_n$ is more than the detection threshold, and it generates an echo detection flag which consists of "0" if the current echo intensity $X_n$ is below the detection threshold.

Then, the behavior data generation module 11 reads out the last behavior data $P_{n-1}$ from the behavior data memory 20. At this time, because an address of the pixel currently processed is inputted into the behavior data memory from the drawing address generation module 5, the behavior data $P_{n-1}$ of the pixel currently processed is read out. Next, the behavior data generation module 11 shifts the last behavior data $P_{n-1}$ by one step to the left and outputs the current echo detection flag to the least significant bit to generate the current behavior data $P_n$. Finally, the current behavior data $P_n$ is outputted to the behavior data memory. At this time, because the address of the pixel currently processed is inputted into the behavior data memory from the drawing address generation module 5, the last behavior data $P_{n-1}$ of the pixel concerned is overwritten with the current behavior data $P_n$. As described above, the behavior data for the past eight scans including the current data are stored. The current behavior data $P_n$ outputted from the behavior data generation module 11 is outputted to the unstable pixel detection module 12 and the data generation module 6.

When the behavior data $P_n$ is inputted from the behavior data generation module 11, the unstable pixel detection module 12 calculates the number of state changes between adjacent bits of the behavior data $P_n$ as a degree of instability. That is, it detects the number of changes from "1" to "0" or from "0" to "1" between the adjacent bits (for example, 0th bit and 1st bit, 6th bit and 7th bit, etc.). For example, if the behavior data $P_n$ is "11111111" or "00000000," the degree of instability is set to "0," and if it is "10101010," the degree of instability is set to "7."

When calculated the degree of instability, the unstable pixel detection module 12 generates unstable state detection data $R_n$ by comparing it with an unstable state detection threshold set in advance. For example, if the degree of instability of "4" is set to the unstable state detection threshold, $R_n=1$ when the degree of instability is "7," and $R_n=0$ when the degree of instability is "1." The unstable pixel detection module 12 outputs the unstable state detection data $R_n$ to the unstable state maintaining data generation module 13.

The unstable state maintaining data generation module 13 generates unstable state maintaining data $H_n$ indicating the degree of instability of the pixel currently processed, and outputs it to the unstable state maintenance memory 21.

The unstable state maintenance memory 21 is a storage medium which sets an orthogonal coordinate system address so as to correspond to the address of the image memory 7, and stores the unstable state maintaining data $H_n$ so as to correspond one to one to each pixel of the image memory 7.

When the unstable state detection data $R_n$ is inputted from the unstable pixel detection module 12, the unstable state maintaining data generation module 13 reads out the last unstable state maintaining data $H_{n-1}$ from the unstable state maintenance memory 21. At this time, because the address of the pixel currently processed is inputted into the unstable state maintenance memory 21 from the drawing address generation module 5, the unstable state maintaining data $H_{n-1}$ of the pixel currently processed is read out.

Here, an example in a case that the unstable state maintenance memory 21 consists of 4 bits per pixel (when an integer within the range of 0 to 15 can be stored) is described below. If $R_n=1$, the unstable state maintaining data generation module 13 determines that the pixel currently processed is in an unstable state, and generates the unstable state maintaining data $H_n$ which consists of "15." On the other hand, if $R_n=0$, it determines that the pixel is in a stable state, and obtains a current unstable state maintaining data $H_n$ by subtracting 1 from the last unstable state maintaining data $H_{n-1}$. If the pixel is in a stable state ($R_n=0$) and the last unstable state maintaining data $H_{n-1}$ is 0, it uses $H_n=0$ as it is.

Finally, the unstable state maintaining data generation module 13 outputs the current unstable state maintaining data $H_n$ to the unstable state maintenance memory 21. At this time, because the address of the pixel currently processed is inputted into the unstable state maintenance memory 21 from the drawing address generation module 5, the last unstable state maintaining data $H_{n-1}$ of the pixel is overwritten with the current unstable state maintaining data $H_n$.

Thereby, whether each pixel has been in a stable state at least over past 16 scans including the current scan can be stored. That is, if $H_n=0$, it can be determined that the pixel is $R_n=0$ (stable state) at least over the past 16 scans including the current scan. On the other hand, if $H_n \neq 0$, it can be determined that the pixel has been $R_n=1$ (unstable state) over the past 16 scans including the current scan.

The reason why the unstable state maintaining data $H_n$ is derived is as follows. That is, the sea surface reflection changes by adjusting an oceanic condition, a wind direction, an antenna height, STC (Sensitivity Time Control) and the like, and further, it becomes weaker as a distance from the ship concerned increases. For this reason, it cannot clarify the boundary of sea surface reflections, and even if it becomes a stable state temporarily from an unstable state, it has a high probability of a sea surface reflection. In this regard, by determining whether the pixel is a sea surface reflection based on the unstable state maintaining data $H_n$ derived as described above to prevent determining that the pixel, which became temporarily in the stable state, is not sea surface reflection.

The unstable state maintaining data $H_n$ is outputted to the sea surface reflection area determination module 14. If the inputted unstable state maintaining data is $H_n \neq 0$, the sea surface reflection area determination module 14 determines that the pixel corresponding to the unstable state maintaining data $H_n$ is a seed of the sea surface reflection, and detects the pixel as a sea surface reflection area reference pixel. On the other hand, even if $H_n=0$ (if the pixel currently processed is not a seed of the sea surface reflection), the sea surface reflection area determination module 14 determines that the pixel currently processed is within the sea surface reflection area when a pixel located near the pixel concerned is a seed of the sea surface reflection.

Figure 3A:
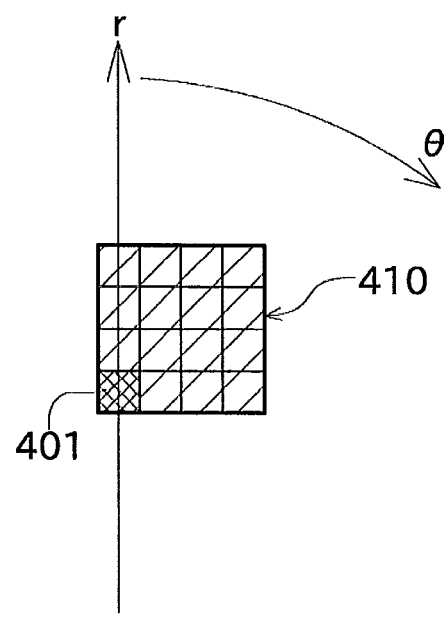
FIG. 3A is a diagram illustrating determination of an expanded sea surface reflection area based on a sea surface reflection area reference pixel.
Figure 3B:
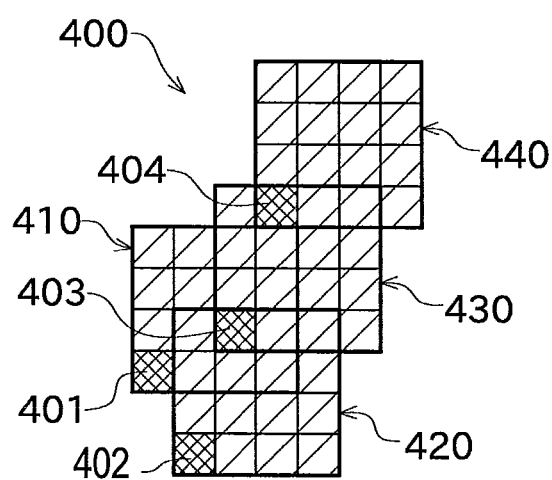
FIG. 3B is a diagram illustrating a synthetic expanded sea surface reflection area.

This will be explained more specifically below with reference to FIG. 3. If the sea surface reflection area determination module 14 detects a sea surface reflection area reference pixel 401 as shown in FIG. 3A, it selects a predetermined number of pixels in the orthogonal coordinate system so as to expand the sea surface reflection area in a direction of a distance "r" and in a sweep rotating direction θ (rotating direction of the radar antenna 1) to determine an expanded sea surface reflection area 410. Here, the sea surface reflection area determination module 14 sets the expanded sea surface reflection area 410 so that the sea surface reflection area reference pixel 401 becomes nearest in the distance "r" direction from the center position of the sweep (position of the radar antenna 1) and becomes nearest to the starting point in the sweep rotating direction θ in the expanded sea surface reflection area 410.

The setting of such an expanded sea surface reflection area is performed whenever the sea surface reflective area determination module 14 receives the unstable state maintaining data $H_n \neq 0$ and the sea surface reflection area reference pixel is detected. For example, in FIG. 3B, two or more sea surface reflection area reference pixels 401, 402, 403, and 404 are detected. In such a case, the sea surface reflection area determination module 14 sets a synthetic expanded sea surface reflection area 400 by combining the expanded sea surface reflection area 410 based on the sea surface reflection area reference pixel 401, an expanded sea surface reflection area 420 based on the sea surface reflection area reference pixel 402, an expanded sea surface reflection area 430 based on the sea surface reflection area reference pixel 403, and an expanded sea surface reflection area 440 based on the sea surface reflection area reference pixel 404.

The sea surface reflection area determination module 14 generates sea surface reflection area data $B_n$ indicating whether the pixel currently processed is a pixel corresponding to the synthetic expanded sea surface reflection area 400, and outputs it to the data generation module 6. Specifically, the sea surface reflection area determination module 14 generates the sea surface reflection area data $B_n=1$ if the pixel currently processed is in the synthetic expanded sea surface reflection area 400, and generates the sea surface reflection area data $B_n=0$ if the pixel is outside the synthetic expanded sea surface reflection area 400, and outputs it to the data generation module 6.

The reason why this embodiment is configured as above is that the pixel neighborhood of the seed of the sea surface reflection has a high possibility to be sea surface reflection. In this regard, by performing the processing as described above, the sea surface reflection area can be set so as to expand to other pixels (pixels with a high possibility of being sea surface reflections) near the pixel concerned as well, in addition to the pixel actually determined to be a seed of the sea surface reflection. Therefore, the pixel with a high possibility of being sea surface reflection can be detected certainly.

Next, a configuration for discriminating an echo from the target object, a white noise, and an interference signal by observing the spatial continuity of the echo is described.

That is, the white noise and the interference signal are detected as having a spatial discontinuity, and the echo from the target object is detected as having a spatial continuity to some extent. Therefore, it can be determined whether the echo is an echo from the target object, a noise or the like by determining the spatial continuity of the echo. This will be described in more detail below.

The echo intensity $X_n$ is inputted into the continuity detection module 9 from the amplitude detection module 16. The continuity detection module 9 is provided with a buffer memory for storing data of two or more echo intensities (echo intensity data) for predetermined azimuth directions, and the echo intensity data are stored sequentially in the buffer memory.

Figure 4A:
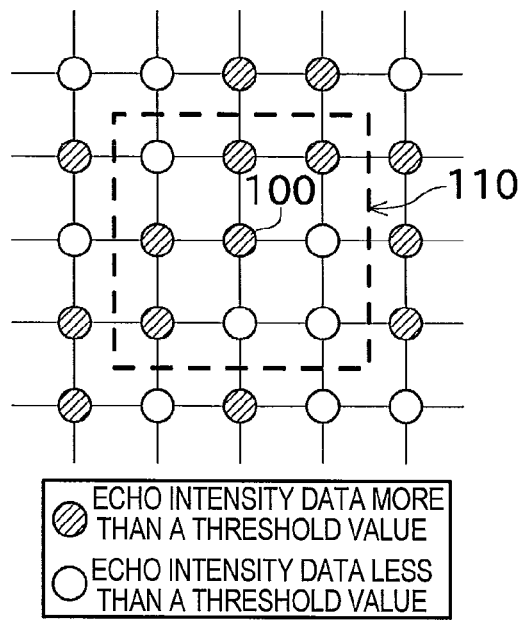
FIG. 4A is a diagram illustrating setting of a continuity determination reference area.

When the echo intensity $X_n$ is newly inputted from the amplitude detection module 16, the continuity detection module 9 sets a continuity determination reference area around the echo intensity data of the pixel to be a determination target for the continuity. For example, in FIG. 4A, an area including eight data near the echo intensity data 100 to be a candidate for the determination is set to a continuity determination reference area 110.

The continuity detection module 9 detects how many echo intensity data having a level more than a detection threshold within the continuity determination reference area, and sets the number to continuity data "$A_n$" of the pixel to be the determination candidate. For example, in the example of FIG. 4A, because five echo intensity data more than the threshold exist within the continuity determination reference area 110, the continuity data of the pixel at the position of the echo intensity data 100 is set to $A_n=5$.

Figure 4B:
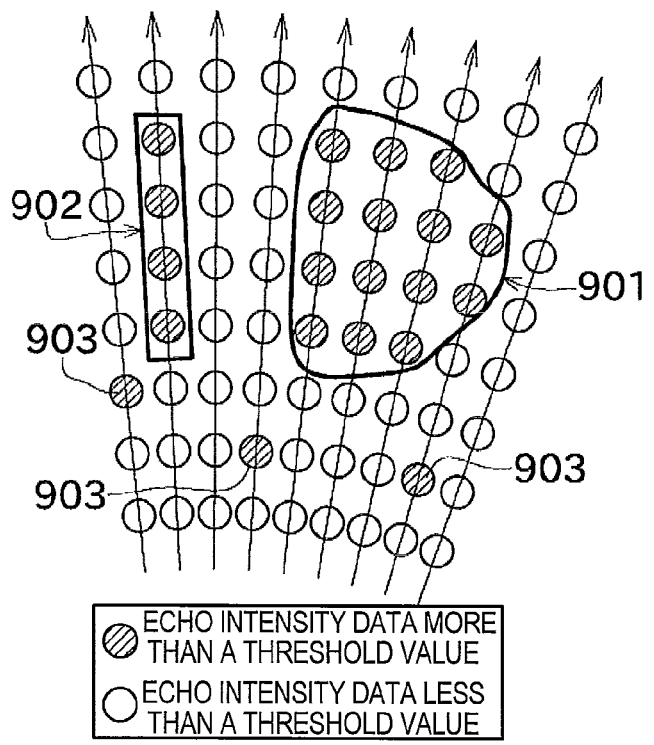
FIG. 4B is a diagram illustrating a difference in spatial continuity of echoes by kinds of a target object.

Here, differences in the continuity data $A_n$ according to kinds of the received signal are described. For example, as shown in FIG. 4B, because the echo intensity data having a level more than the detection threshold are gathered in a target object 901, its continuity data $A_n$ becomes larger. On the other hand, because the echo intensity data having a level more than the predetermined threshold exist in an interference signal 902 only in the same direction, its continuity data $A_n$ becomes smaller. Further, because a white noise 903 is generated in a single form in many cases, its continuity data $A_n$ becomes smaller. Therefore, by deriving the continuity data $A_n$ as described above, the echo from the target object, the interference signal, and the white noise can be discriminated from each other.

Next, a configuration for calculating a moving speed of the target object is described.

As described above, the conventional radar device using AIS or ARPA to detect moving speeds of other ships has a problem in which the speeds of two or more target objects cannot be obtained certainly in real time.

Therefore, the radar device of this embodiment is configured so that it estimates a Doppler frequency of an echo, and derives a moving speed of a target object based on the Doppler frequency. With this configuration, even if the device does not stand by reception of AIS information from other ships or does not observe transition of the past radar images over two or more scans, it can derive the moving speed of the target object. Therefore, the device can derive moving speeds of many target objects certainly and quickly.

What can be derived by AIS or ARPA is an absolute velocity or a relative velocity of the target object in a horizontal plane. In this regard, if it is based on the Doppler frequency, only a radiating direction component of an electric wave can be detected among the relative velocity of the target object with respect to a ship concerned. Therefore, the value of the target object speed found from the Doppler frequency can be used as an index for determining how fast the target object is approaching toward the ship concerned, thereby it is especially effective in the radar device of this embodiment (described later in detail).

However, because the speed of a ship is comparatively slow, the Doppler frequency to be generated is low and, thus, it is difficult to detect the Doppler frequency by one transmission and reception. Thus, in this embodiment, the Doppler frequency is derived by the pulse doppler (pulse pair) method.

Figure 5:
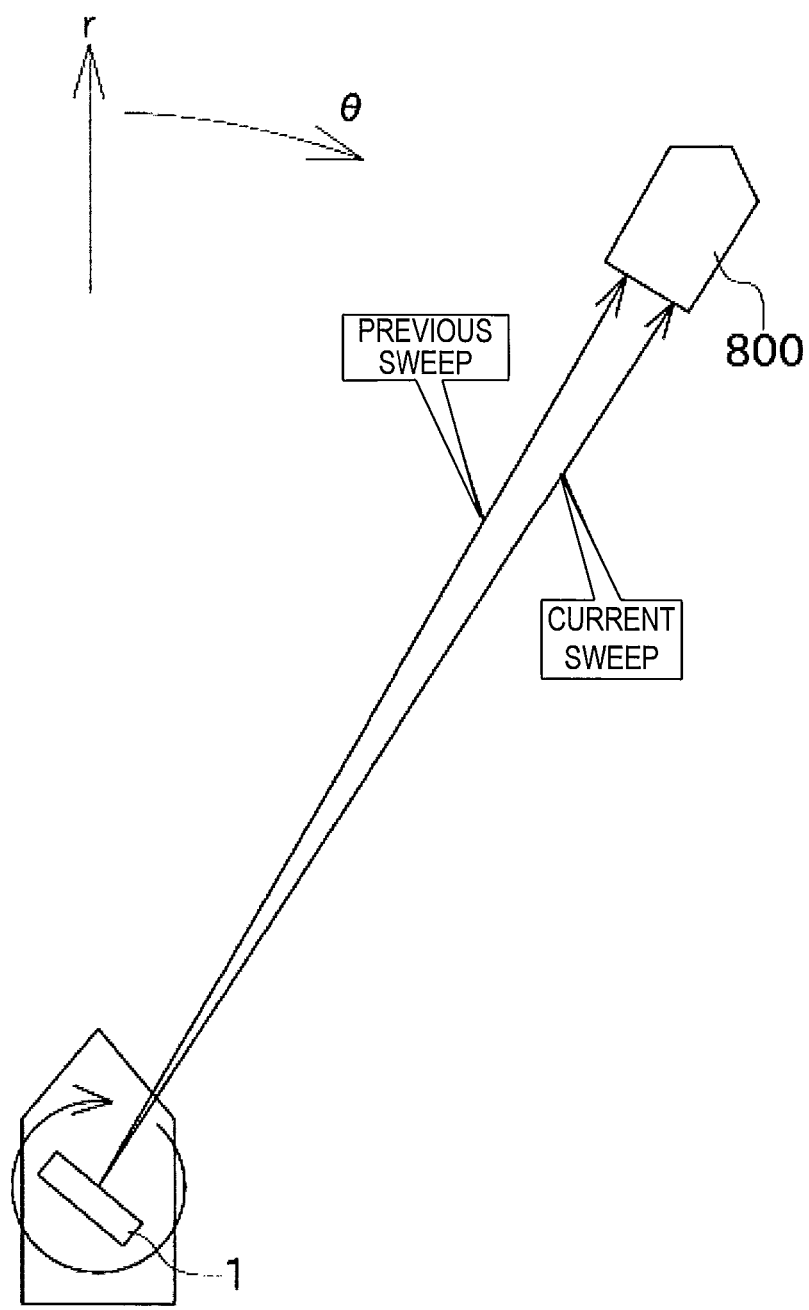
FIG. 5 is a diagram illustrating transmission and reception during a current sweep and a previous sweep against a single target object.

The proper pulse doppler method is to emit pulse-shaped electric waves with an appropriate interval therebetween, acquire a receiving pulse from the same target object twice, and detects a phase change between the two received pulses to derive the Doppler frequency of the target object. In this embodiment, because the pulse-shaped electric waves are emitted while rotating the radar antenna 1, the transmitting direction of the pulses changes slightly between the two transmission pulses. However, for example, as shown in FIG. 5, if taking between a previous sweep and a current sweep into consideration, it can be deemed that the echoes are acquired from the same target object 800. Therefore, in this embodiment, the Doppler frequency of the echoes from the target object is detected based on the phase change between pulse hits (between the echo received in the current sweep and the echo received in the previous sweep).

This will be described in more detail below. The radar device of this embodiment is provided with a speed estimating module 22. The speed estimating module 22 includes the pulse doppler processing module 17 and a target object speed calculation module 18.

When IQ received data is inputted from the sweep memory 4, the pulse doppler processing module 17 derives a phase of a carrier wave of an echo based on the IQ received data. A phase $\phi_n$ of the IQ received data stored in the n-th address from the head address of the sweep memory 4 can be derived by the following Equation (11) based on the Equations (6) and (7) described above.

$$\phi_n = \tan^{-1}\frac{Q_n}{I_n} \tag{11}$$

The pulse doppler processing module 17 includes a phase buffer memory which can store phase data for one sweep to store a phase in the previous sweep. The phase buffer memory is configured so that its addresses correspond to addresses of the sweep memory one to one.

After the current phase $\phi_n$ is derived, the pulse doppler processing module 17 reads out a phase $\phi_n'$ of the echo received in the previous sweep, from the n-th position of the phase buffer memory from the head address. A phase change $\Delta\phi$ between the carrier wave of the echo in the current sweep and the carrier wave of the echo in the previous sweep can be derived by the following Equation (12). Here, because it can be considered that the echoes are received from the same target object in the current sweep and the previous sweep as described above, the phase change $\Delta\phi$ is generated by movement of the target object between the reception of the previous echo and the reception of the current echo.

$$\Delta\phi = \phi_n - \phi_n' \tag{12}$$

The phase change by movement of the target object can be expressed by the following Equation (13). Here, $f_d$ is a Doppler frequency, $\Delta T$ is a transmission interval of the pulse-shaped electric waves (radiated signals), and PRF is a pulse repetition frequency (unit: Hz) of the pulse-shaped electric wave. Therefore, the pulse doppler processing module 17 can calculate the Doppler frequency $f_d$ by performing the calculation of Equation (14). When the Doppler frequency $f_d$ is calculated, the pulse doppler processing module 17 outputs the Doppler frequency $f_d$ concerned to the target object speed calculation module 18.

$$\Delta\phi = 2\pi f_d \Delta T = \frac{2\pi f_d}{PRF} \tag{13}$$

$$f_d = \frac{1}{2\pi} PRF \cdot \Delta\phi \tag{14}$$

When the Doppler frequency $f_d$ is inputted, the target object speed calculation module 18 derives a moving speed of the target object. Specifically, the target object speed calculation module 18 first derives a relative velocity $V_r$ of the device and the target object based on the Doppler frequency $f_d$. The target object speed calculation module 18 calculates the relative velocity $V_r$ by the relational expression (15) between the Doppler frequency $f_d$ and the relative velocity $V_r$. Here, λ is a wavelength of the carrier wave of the signal. The relative velocity $V_r$ which can be derived by Equation (15) is a relative velocity of the device and the target object in the radiating direction component of the electric wave from the device (radar antenna 1) (relative velocity between the target object and the device in the straight-line distance direction).

$$V_r = \frac{\lambda}{4\pi}(2\pi f_d) \tag{15}$$

As described above, the relative velocity $V_r$ which can be calculated from the Doppler frequency is only a radiating direction component of the electric wave of the relative velocity of the target object with respect to the ship concerned. Therefore, the value of the relative velocity $V_r$ can be used as an index indicative of how fast the target object is approaching toward the ship concerned. Because the moving speed of the target object is obtained to determine the risk level of the target object in this embodiment (described later in detail), what is necessary here is to grasp how fast the target object is approaching toward the ship concerned. That is, in this embodiment, information on a relative velocity or an absolute velocity of the target object in a horizontal plane is not necessity to be acquired and, thus, it will be enough to know the relative velocity (that is, the relative velocity $V_r$ described above) in the radiating direction (straight-line distance direction between the target object and the ship concerned) of the electric wave.

Therefore, it can be said that the above method for obtaining the moving speed of the target object by the pulse doppler method is especially effective for determining the risk level of the target object because information required for deriving the risk level of the target object (relative velocity of the target object in the radiating direction component of the electric wave) can be acquired quickly (in real time).

Next, the target object speed calculation module 18 calculates target object speed data $V_n$, which expresses the moving speed of the target object in 2 bits, based on the relative velocity $V_r$ derived based on the Doppler frequency $f_d$. If assumed that a value of the relative velocity $V_r$ when the target object moves away from the ship concerned is defined to be a negative value and when the target object approaches the ship is defined to be a positive value, the target object speed data $V_n$ can be expressed as follows.

For example, when the relative velocity $V_r$ of the target object is slower than −1 kt (when the target object moves away), the target object speed calculation module 18 sets target object speed data to $V_n$=0. When the relative velocity $V_r$ of the target object is faster than −1 kt and slower than 1 kt, the target object speed data is set to $V_n$=1. When the relative velocity $V_r$ of the target object is faster than 1 kt, the target object speed data is set to $V_n$=2 (when the target object is approaching). The target object speed data $V_n$ derived as described above is outputted to the data generation module 6.

Next, a configuration for determining the risk level of the target object is described. The risk level of the target object is determined by the data generation module 6. Therefore, the data generation module 6 serves as a risk level detection module.

An echo intensity $X_n$, continuity data $A_n$, behavior data $P_n$, sea surface reflection area data $B_n$, and target object speed data $V_n$ for the pixel currently processed are inputted into the data generation module 6.

The data generation module 6 first determines a kind of a received signal which exists at a position of the pixel currently processed based on the echo intensity $X_n$, the continuity data $A_n$, the behavior data $P_n$, and the sea surface reflection area data B. Therefore, the data generation module 6 serves as a kind estimating module. The data generation module 6 determines the kind of the received signal of the pixel concerned by four kinds, such as a stationary target object, a moving target object, a sea surface reflection, and others (unused echoes such as interferences, noises). This will be described in more detail below.

If the echo intensity $X_n$ of the pixel currently processed is less than a predetermined threshold, it can be determined that the target object does not exist at the position of the pixel concerned. For example, if the value of the continuity data $A_n$ is small even if the value of the echo intensity $X_n$ is large, it can be determined that the received signal of the pixel is a radar interference and a white noise. On the other hand, if the sea surface reflection area data $B_n$ is "1," it is determined that the received signal of the pixel is a sea surface reflection.

If each bit of the behavior data $P_n$ has many "1s (ones)," the data has a high detection frequency, that is, it can be determined that the object is a stationary target object (such as a land). If the pixel currently processed is neither a sea surface reflection nor a radar interference nor a white noise, and if the value of the behavior data $P_n$ is "00000001" or "00000011" (that is, when the echoes are detected in the latest several scans), it can be determined that the data is a moving target object (such as a ship).

When the kind of the received signal of the pixel currently processed is determined, the data generation module 6 generates an echo kind determination result $T_n$ which expresses the kind of the received signal by 2 bits. Hereinafter, a specific example of the determination of the echo kind determination result $T_n$ is described. For example, in $P_n$, if the number of "1" bits is six or more, the module determines that the data is a stationary target object, and sets to $T_n$=3. If the value of $P_n$ is "00000001" or "00000011" and if $B_n$=0 and $A_n$>3, the module determines that the data is a moving target object, and sets to $T_n$=2. If $B_n$=1, the module determines that the data is a sea surface reflection, and sets to $T_n$=1. On the other hand, if the data does not fall under any of the cases described above, the module determines that the data is other signal (such as an interference signal or a white noise), and sets to $T_n$=0.

Then, the data generation module 6 generates an echo risk level $D_n$ which expresses the risk level of the target object which exists at the position of the pixel currently processed by 2 bits based on the echo kind determination result $T_n$ and the target object speed data $V_n$. For example, even if the target object speed data $V_n$=2 (when determined that the target object is approaching), it can be determined that the risk level of a collision against the target object of the pixel is low if the kind of the received signal is a sea surface reflection. If $V_n$=2 and if the kind of the received signal indicates a moving target object, it can be determined that the target object of the pixel has a high risk level.

Hereinafter, a specific example of the determination of the echo risk level $D_n$ is described. For example, if $T_n$=2 or $T_n$=3 and if $V_n$=2, the module determines that the risk level of the collision against the target object is high, and sets to $D_n$=2. If $T_n$=2 or $T_n$=3 and if $V_n$=1, or if $T_n$=0 and if $V_n$=2, the module determines that the risk level of the collision against the target object is a middle level, and sets to $D_n$=1. If $T_n$=0 and $V_n$=1, or if $V_n$=0, or if $T_n$=1, the module determines that the risk level of the collision against the target object is low, and sets to $D_n$=0.

When the echo risk level $D_n$ of the pixel currently processed as described above is obtained, the data generation module 6 outputs the echo risk level $D_n$ and the echo intensity $X_n$ to the image memory 7. At this time, because the address of the pixel currently processed is inputted into the image memory 7 from the drawing address generation module 5 as described above, the echo risk level determination result $D_n$ and the echo intensity $X_n$ are stored at the position of the pixel currently processed.

Next, a configuration for classifying by color and displaying the indication of the display 8 according to the echo risk level and the echo intensity is described.

First, a conventional configuration is described briefly. In the conventional radar device, a configuration in which a display color is changed according to the echo intensity is known, such as a pixel with a strong echo intensity is displayed in red, a middle level pixel in yellow, and a weak level pixel in green. However, in this conventional method, although one is able to quickly grasp a strong echo intuitively, one cannot determine quickly only by looking at a radar image whether the risk level of the collision with the echo is high or low.

On the other hand, the other ship display device which JP2003-48595(A) discloses has a configuration of changing a displaying method of symbols indicative of a position of a target object according to a collision risk level. However, because the configuration of JP2003-48595(A) needs to acquire the position at which the symbol is displayed (that is, position of the target object), it acquires the position of the target object from a detection image and performs processing to track the position. Therefore, if there are too many target objects, the configuration of JP2003-48595(A) may acquire no target object because a processing load for acquiring the position of the target object becomes too much.

In this regard, the radar device of this embodiment is configured as follows.

As described above, the echo risk level $D_n$ and the echo intensity $X_n$ are stored in each pixel of the image data stored in the image memory 7. The display color selection module 15 reads out each pixel data from the image memory 7 synchronizing with raster scanning of the display 8, determines a display color according to the echo risk level $D_n$ and the echo intensity Xn of the pixel, and transmits it to the display 8.

Specifically, the display color selection module 15 has a color palette for associating the data of each pixel (the echo risk level $D_n$ and the echo intensity $X_n$) with an RGB value which specifies a color to display the pixel on the display 8.

In this embodiment, the display color selection module 15 changes the color according to the echo risk level $D_n$ of each pixel, and selects the display color which is changed in a darkness of color according to the echo intensity $X_n$. For example, in this embodiment, because the echo risk level $D_n$ is determined in three levels, the display color of a pixel is changed in three levels of red, yellow, and blue, according to the echo risk level $D_n$. In this case, the display color selection module 15 is provided with a color palette which stores RGB values which can express a shade of the three colors of red, yellow, and blue.

Then, when the pixel data (the echo intensity $X_n$ and the echo risk level $D_n$ of the pixel) is read out from the image memory 7 synchronizing with the raster scanning of the display 8, the display color selection module 15 determines the display color of the pixel with reference to the color palette. For example, the display color selection module 15 refers to the blue color palette when $D_n=0$, the yellow color palette when $D_n=1$, and the red color palette when $D_n=2$. Thereby, according to the echo risk level, the echo can be displayed in three levels of red, yellow, and blue.

When one color is selected from the color palettes of three colors according to the echo risk level $D_n$, the display color selection module 15 acquires an RGB value from the selected color palette using the echo intensity $X_n$ as a parameter. At this time, the display color selection module 15 selects an RGB value of a darker color when $X_n$ is large, and selects an RGB value of a lighter color when $X_n$ is small. Thereby, a pixel with a higher echo intensity $X_n$ can be displayed more exaggerated.

When the RGB value of the pixel is determined as described above, the display color selection module 15 transmits it to the display 8.

By the above easy processing, the situation of the echo can be displayed on the display 8 in the display color according to the echo risk level $D_n$ and the echo intensity $X_n$. In addition, for example, because the pixel with a higher echo intensity and a higher echo risk level is displayed more exaggerated (in this case, displayed in dark red), an operator can determine such a risky echo quickly.

As described above, the radar device of this embodiment includes the radar antenna 1, the display 8, the speed estimating module 22, and the data generation module 6. The radar antenna 1 repeats transmission and reception of a pulse-shaped signal while rotating in a horizontal plane. The display 8 displays a radar image which shows a position of the target object around the device. The speed estimating module 22 estimates a relative velocity of the device concerned and the target object in the radiating direction component of the electric wave from the device. The data generation module 6 derives a risk level of the target object based on the relative velocity of the target object which the speed estimating module 22 estimated. The speed estimating module 22 detects the relative velocity based on a phase change between the echo which the radar antenna 1 received this time and the echo which the radar antenna 1 received immediate before. Then, when the display 8 displays the radar image, it can make the displaying method of a target object with a high risk level differ from a target object with a low risk level.

Thereby, because the displaying method of the received signal can be changed according to the risk level, an operator can determine the risky target object quickly even if he/she is inexperienced, for example. Because it can determine how fast the target object is approaching toward the device based on the relative velocity of the device and the target object in the radiating direction component of the electric wave from the device, an especially risky target object like a target object which approaches at a high speed can be displayed appropriately to attract an operator's attention, for example.

Further, by observing the phase change of the echo as described above, it can derives the Doppler frequency and detect a speed of the target object based on the frequency. Therefore, there is neither the necessity of observing the radar image over several scans, nor the necessity of standing by the communications from other ships, and the speed of the target object can be detected quickly. Because the configuration is not to acquire a target object in a radar image and detects a speed, complicated calculation processing is not necessary, and there is no possibility in which the acquisition of the target object is lost and it becomes impossible to detect the speed. Therefore, because the moving speeds of many target objects can certainly be detected, the risky target object can certainly be detected in the data generation module 6. The moving speed of the target object which can be derived from the Doppler frequency is the relative velocity of the electric wave in the radiating direction. Therefore, the device can determine easily how fast the target object is approaching toward the device based on the moving speed of the target object detected by the above configuration of this embodiment. If the moving speed of the target object is slow, because the Doppler frequency to the extent that it can be observed is not generated, it may be difficult to observe the frequency change by one transmission and reception to detect the speed of the target object. In this regard, by observing the phase change between two echoes as described above, the speed can be detected even if it is a slow target object.

The radar device of this embodiment is configured as follows. That is, in this radar device, the data generation module 6 detects at least the echo signal from the target object. Then, the data generation module 6 derives the risk level of the target object based on the echo signal from the target object which the data generation module 6 detected and the relative velocity which the speed estimating module 22 estimated.

Thus, by detecting the echo from the target object, because the target object which does not have a risk of a collision such as a sea surface reflection and the target object which has a risk of a collision such as the target object can be discriminated from each other and displayed appropriately, for example, it excels in reliability.

In addition, in the radar device of this embodiment, when the display 8 displays a radar image, it can classify it by color according to the risk levels of the target objects, and display each target object by a darkness of color according to the intensity of the echo from the target object.

Thereby, the operator can grasp the risk level of the target object intuitively by the color displayed on the display 8. In addition, the operator can grasp the intensity of the echo intuitively by the darkness of color displayed on the display 8.

Although a preferable embodiment of the invention is described above, the above configuration may be modified as follows, for example.

The above method of deriving the risk level of the target object described in this embodiment is merely an example and may be modified variously. For example, the risk level of the target object may be detected in four or more levels. Similarly, the kind of the target object is detected by four kinds; however, it is not limited to this. Similarly, the moving speed is determined in three levels; however, it may be determined more finely.

The phrase used herein "the risk level of the target object is derived based on the relative velocity," means that the information related to the relative velocity of the target object may be derived in addition to deriving the risk level in consideration of other information. For example, like this embodiment, even if it is a configuration of deriving the risk level of the target object in consideration of the information related to the kind of the target object in addition to the relative velocity of the target object, it still can say that the configuration performs that "the risk level of the target object is derived based on the relative velocity." Further, for example, the distance from the device to the target object may also be taken into consideration. In this case, it may determine the risk level higher for the target object closer to the device. Further, for example, the risk level of the target object may be derived in consideration of information acquired from the conventional ARPA, AIS, or the like in addition to the information on the relative velocity of the target object.

In this embodiment, although the stationary target object ($T_n$=3) and the moving target object ($T_n$=2) are determined for their risk levels on the same conditions, they may be different from each other. In this case, it is possible to make the risk level become higher for the moving target object.

In this embodiment, although the darkness of the display color is determined according to the echo intensity, it is not limited to this. For example, the darkness of color may be determined based on a value by averaging the echo intensities for several scans of the past.

In this embodiment, although the Doppler frequency is calculated using the phase difference between a current signal and a signal of 1 sweep before, it is not limited to this. For example, the Doppler frequency may also be derived from an average of phase differences using signals for two or more sweeps of the past. By configuring in this way, it will be difficult to be influenced by noises; thereby the moving speed of the target object can be derived more accurately. In order to realize this configuration, the device may be configured so that it can store data for two or more sweeps in the sweep memory 4.

In this embodiment, although the radar antenna emits a pulse-shaped electric wave, it may use a signal of FMCW (Frequency Modulation Continuous Wave).

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative sense rather than a restrictive sense, and all such modifications are intended to be included within the scope of the present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A radar device, comprising:
an antenna configured to transmit an electromagnetic wave and to receive an echo signal from a target object while rotating in a horizontal plane such that a scan of the antenna represents one 360 degree rotation of the antenna;
a display module configured to display the target object so as to correspond the echo signal to a position of the target object with respect to the antenna;
a speed calculation module configured to calculate a relative velocity of the antenna and the target object; and
a risk level detection module configured to detect a risk level of the target object based on the relative velocity of the target object calculated by the speed calculation module such that a risk level is detected for an echo signal received in a single scan of the antenna;
a kind determination module configured to detect a signal kind of the echo signal based on echo signals received in two or more scans of the antenna;
the risk level detection module being further configured to update the risk level of the target object based on the signal kind detected by the kind determination module and the relative velocity calculated by the speed calculation module; and
wherein the signal kind includes at least a moving target object, and a sea surface reflection;
said risk level detection module being further configured to detect a lower risk level for a target object determined to be a sea surface reflection, said lower risk level being lower than a risk level associated with a moving target object;
the speed calculation module being further configured to calculate the relative velocity of the target object based on a change in phases of at least two of the echo signals received at different times; and
the display module being further configured to control a display mode of the target object based on the risk level.

2. The radar device of claim 1, the display module being further configured to use the display mode in which the display of a target object having a higher risk level is emphasized compared with a target object having a lower risk level.

3. The radar device of claim 1, the display module being further configured to display the target object using data that corresponds to the echo signal and contains two or more pixels; and
the kind determination module being further configured to detect the signal kind from the displayed echo signal data on a pixel-by-pixel basis.

4. The radar device of claim 1, the display module being further configured to set a color or a color palette to display the target object based on the risk level.

5. The radar device of claim 4, the display module being further configured to control a darkness of the color to display the target object based on an intensity of the echo signal from the target object.

6. The radar device of claim 1, the risk level detection module being further configured to detect the target object that is located nearer from the antenna by a higher risk level.

7. The radar device of claim 1, the speed calculation module being further configured to calculate the relative velocity based on the echo signal currently received by the antenna, the echo signal previously received by the antenna, and the phase change therebetween.

8. The radar device of claim 1, the risk level detection module being further configured to detect the risk level of the target object based on the relative velocity of the target object, the signal kind of the target object, and information acquired from ARPA.

9. The radar device of claim 1, the kind determination module being further configured to determine a signal kind based on at least one of echo intensity, continuity data, behavior data, and sea surface reflection data.

10. A radar device, comprising:
an antenna configured to transmit an electromagnetic wave and configured to receive an echo signal from a target object while rotating in a horizontal plane such that a scan of the antenna represents one 360 degree rotation of the antenna;
a display module configured to display the target object so as to correspond the echo signal to a position of the target object with respect to the antenna;
a speed calculation module configured to calculate a relative velocity of the antenna and the target object;
a risk level detection module configured to detect a risk level of the target object based on the relative velocity of the target object calculated by the speed calculation module such that a risk level is detected for an echo signal received in a single scan of the antenna; and
a kind determination module configured to detect a signal kind of the echo signal based on echo signals received in two or more scans of the antenna;
the risk level detection module being further configured to update the risk level of the target object based on the signal kind detected by the kind determination module and the relative velocity calculated by the speed calculation module;
the speed calculation module being further configured to calculate the relative velocity of the target object based on a change in phases of at least two of the echo signals received at different times;
the display module being further configured to control a display mode of the target object based on the risk level; and,
wherein the signal kind includes at least a stationary target object, a moving target object, and a sea surface reflection.

11. The radar device of claim 10, the risk level detection module being further configured to detect the moving target object by a higher risk level compared with the stationary target object and the sea surface reflection among the signal kinds.

12. A method of displaying a screen image of a radar device, comprising:
transmitting an electromagnetic wave and receiving an echo signal from a target object with an antenna rotating in a horizontal plane such that a scan of the antenna represents one 360 degree rotation of the antenna;
calculating a relative velocity component of the radar device and the target object in a radiating direction of the electromagnetic wave from the radar device based on a change in phases of at least two of the echo signals received at different times;
detecting a signal kind of the echo signal based on echo signals received in two or more scans of the antenna, the signal kind including at least a moving target object and a sea surface reflection;
obtaining a risk level of the target object based on the calculated relative velocity of the target object such that a risk level is obtained for an echo signal received in a single scan of the antenna;
updating the obtained risk level based on the detected signal kind of the echo signal;
said updating including obtaining a lower risk level for a target object determined to be a sea surface reflection, said lower risk level being lower than a risk level associated with a moving target object; and
controlling a display mode of the target object based on the obtained risk level.

13. The method of claim 12, said detecting a signal kind including determining a signal kind based on at least one of echo intensity, continuity data, behavior data, and sea surface reflection data.

14. The method of claim 12, the method further comprising displaying the target object using data that corresponds to the echo signal and contains two or more pixels; and
said detecting a signal kind including detecting the signal kind from the displayed echo signal data on a pixel-by-pixel basis.

* * * * *